US008448929B2

(12) United States Patent
Prot et al.

(10) Patent No.: US 8,448,929 B2
(45) Date of Patent: May 28, 2013

(54) RIVETING SCREW TACK AND USE THEREOF FOR TEMPORARILY FIXING A BORING GRID TO ELEMENTS TO BE ASSEMBLED

(75) Inventors: Philippe Prot, Vignoux sur Barangeon (FR); Marc Roussy, Bourges (FR)

(73) Assignee: Lisi Aerospace (FR)

( * ) Notice: Subject to any disclaimer, the term of this patent is extended or adjusted under 35 U.S.C. 154(b) by 481 days.

(21) Appl. No.: 12/671,908

(22) PCT Filed: Jul. 25, 2008

(86) PCT No.: PCT/FR2008/001112
§ 371 (c)(1),
(2), (4) Date: Feb. 2, 2010

(87) PCT Pub. No.: WO2009/047405
PCT Pub. Date: Apr. 16, 2009

(65) Prior Publication Data
US 2011/0232072 A1 Sep. 29, 2011

(30) Foreign Application Priority Data
Aug. 3, 2007 (FR) ..................... 07 56929

(51) Int. Cl.
*B23Q 1/00* (2006.01)
*B23Q 3/14* (2006.01)
*B23Q 3/00* (2006.01)

(52) U.S. Cl.
USPC .......... 269/49; 269/48.1; 269/48.2; 269/48.3; 269/48.4; 269/47

(58) Field of Classification Search
USPC . 269/49, 48.1, 48.2, 48.3, 48.4, 47; 29/243.5, 29/243.53, 243.523, 243.56, 255
See application file for complete search history.

(56) References Cited

U.S. PATENT DOCUMENTS 2,269,188 A 1/1942 De Mooy
2,271,879 A 2/1942 Wallace
(Continued)

FOREIGN PATENT DOCUMENTS

EP 0 366 808 8/1994
FR 1981 18309 4/1983
GB 153 021 1/1922

OTHER PUBLICATIONS

WIPO, Rapport de Recherche Internationale, PCT/FR2008/001112, Jun. 15, 2009.
(Continued)

*Primary Examiner* — Monica Carter
*Assistant Examiner* — Seahee Yoon
(74) *Attorney, Agent, or Firm* — Henricks, Slavin & Holmes LLP

(57) ABSTRACT

The invention relates to a riveting tack (50) to be introduced into coaxial openings of at least two elements to be assembled, and comprising a hollow cylindrical body (51), a rod (53) passing through the hollow body and partially provided with an external thread (52*a*), a nut (54) mounted on the threaded end (53*a*), two half-clips (56) fixed to the rod (53) and comprising hooking lips (57) on the ends thereof, and a spacer (58) arranged between the two half-clips (56), the rod/half-clip set being axially mobile along the spacer (58) between a first position wherein the hooking lips (57) are radially close, and a second position wherein the two half-clips (56) are retracted inside the hollow body (51) and radially distanced from each other. The invention is characterized in that the set formed by the half-clips (56) and the spacer (58) is, in the cross-section thereof, in the form of a near-perfect circle having a diameter identical to the inner diameter of the openings.

14 Claims, 7 Drawing Sheets

U.S. PATENT DOCUMENTS

| | | | |
|---|---|---|---|
| 2,294,013 A * | 8/1942 | Wallace | 269/48.4 |
| 2,317,315 A * | 4/1943 | Wallace | 269/48.4 |
| 2,320,493 A | 6/1943 | Wallace | |
| 2,354,480 A | 7/1944 | Rossmann | |
| 3,463,527 A * | 8/1969 | Baker | 411/78 |
| 3,568,562 A * | 3/1971 | Harwood | 269/48.3 |
| 4,548,533 A * | 10/1985 | Pratt | 411/55 |
| 5,060,958 A * | 10/1991 | Fischer et al. | 279/4.12 |
| 5,240,361 A * | 8/1993 | Armstrong et al. | 269/48.2 |
| 5,275,515 A | 1/1994 | Leifsen | |
| 5,312,465 A | 5/1994 | Riutta | |
| 5,318,394 A | 6/1994 | Pierce | |
| 5,487,766 A | 1/1996 | Vannier | |
| 5,497,633 A | 3/1996 | Jones et al. | |
| 5,538,074 A | 7/1996 | Meyer | |
| 5,598,719 A | 2/1997 | Jones et al. | |
| 5,961,044 A | 10/1999 | Dalbec et al. | |
| 6,099,607 A | 8/2000 | Haslebacher | |
| 6,755,407 B1 | 6/2004 | Olson | |
| 6,808,365 B2 | 10/2004 | Poon et al. | |
| 6,953,322 B2 | 10/2005 | Lim | |
| 6,978,988 B2 * | 12/2005 | Chupick | 269/48.1 |
| 7,244,179 B2 | 7/2007 | Chien | |
| 7,417,832 B1 | 8/2008 | Erickson et al. | |
| 2004/0164475 A1 * | 8/2004 | Anderson et al. | 269/49 |
| 2005/0084344 A1 | 4/2005 | Dods | |
| 2005/0200066 A1 * | 9/2005 | McClure | 269/47 |
| 2013/0011252 A1 | 1/2013 | Crawford et al. | |

OTHER PUBLICATIONS

Dyson, J. et al., U.S. Office Action mailed Jan. 10, 2013, directed to U.S. Appl. No. 12/716,849; 9 pages.

Gammack, P. et al., U.S. Office Action mailed Feb. 14, 2013, directed to U.S. Appl. No. 12/716,725; 25 pages.

* cited by examiner

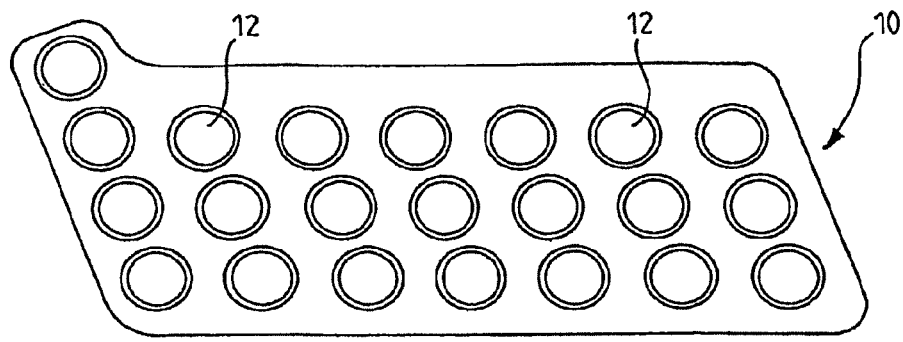
PRIOR ART FIG.1
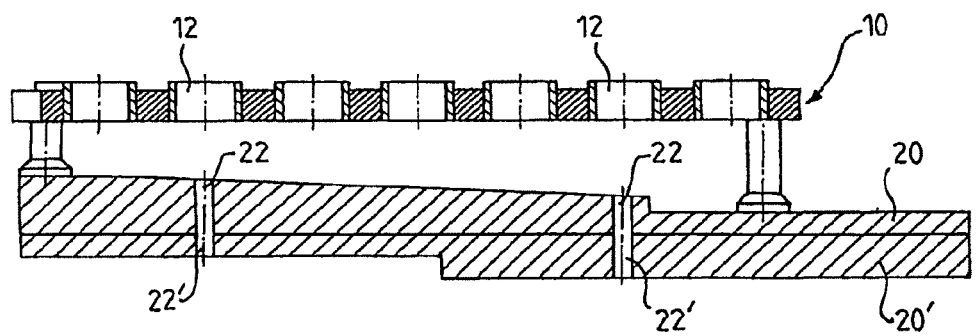
PRIOR ART FIG.2
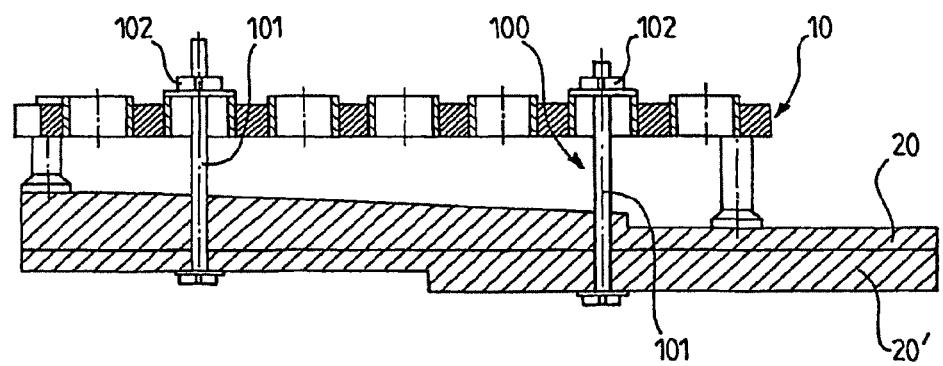
PRIOR ART FIG.3

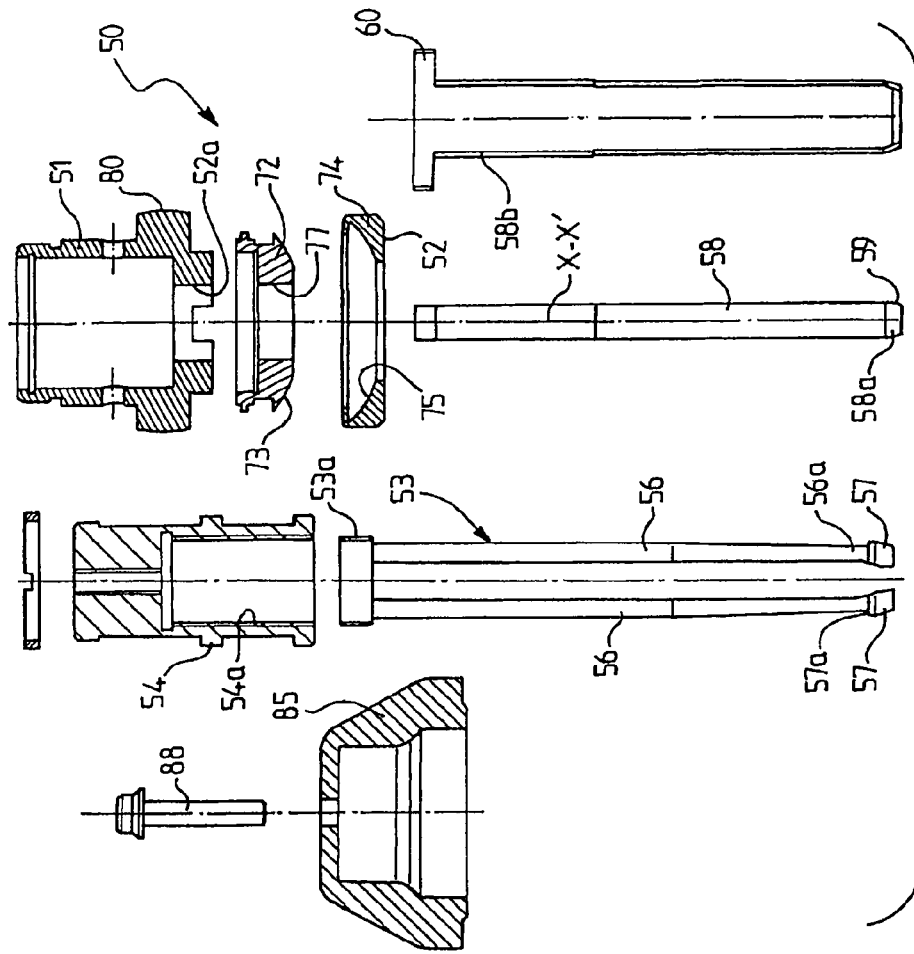
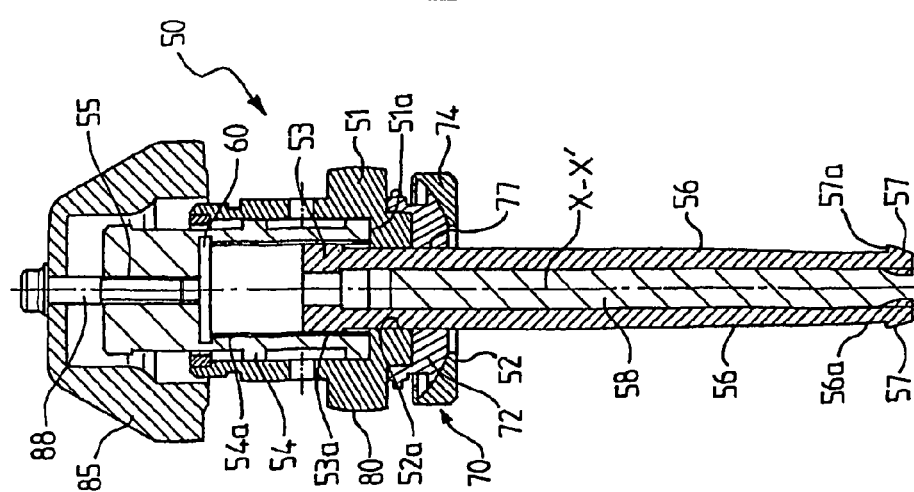
FIG.8
FIG.7

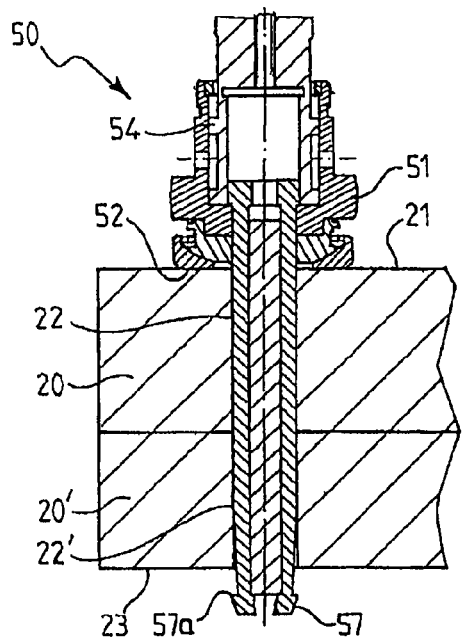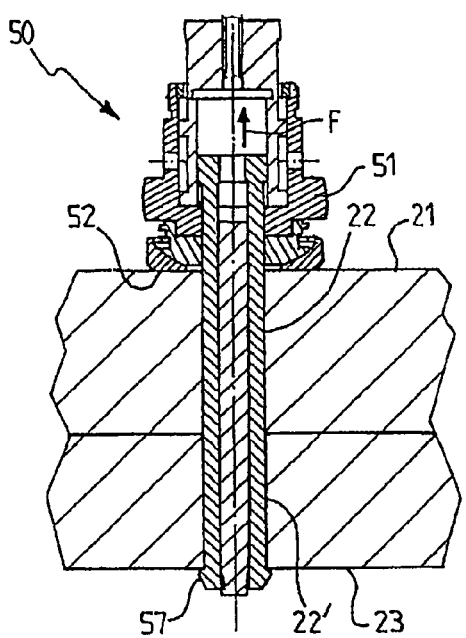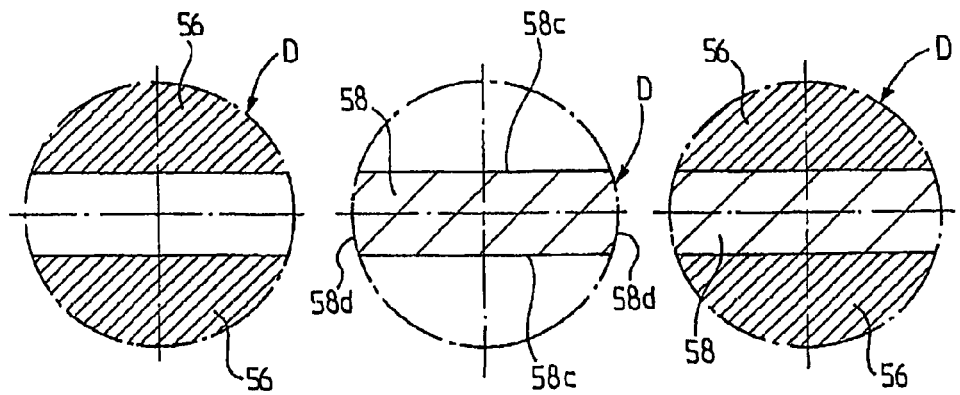

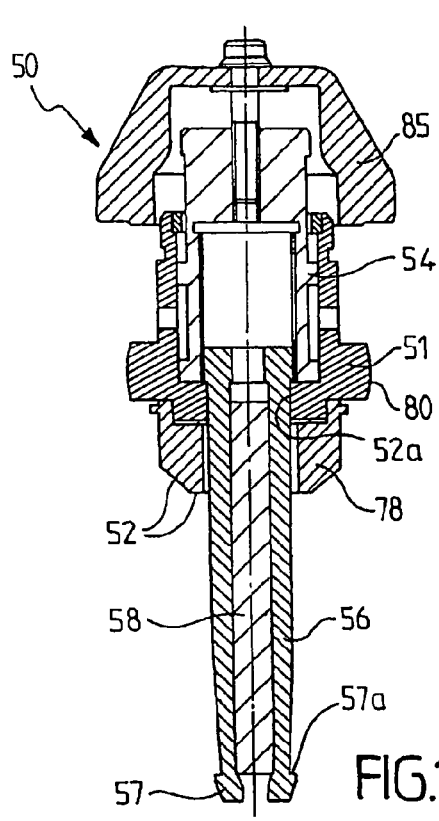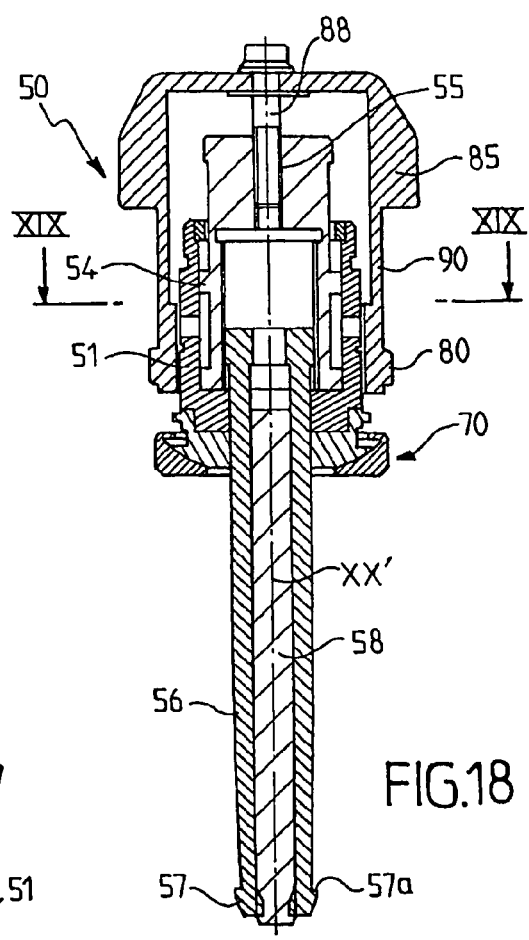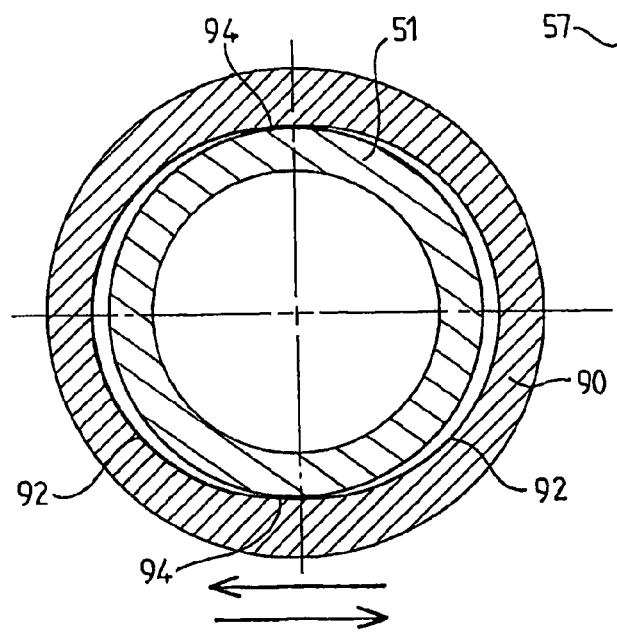

RIVETING SCREW TACK AND USE THEREOF FOR TEMPORARILY FIXING A BORING GRID TO ELEMENTS TO BE ASSEMBLED

CROSS REFERENCE TO RELATED APPLICATIONS

This application is a National Stage of International Application No. PCT/FR2008/001112, filed Jul. 25, 2008.

This invention relates to a riveting screw tack to be introduced into the respective coaxial openings of at least two elements to be assembled, the type comprising:
- a hollow cylindrical body extending along an elongation axis and having a bearing surface intended to come into contact with the outer surface of the first of the two elements,
- a central rod locally passing through the hollow body and having a portion located inside said hollow body provided with an external threading,
- a nut mounted on the threaded end of the rod and supported on the end surface of the hollow body,
- two axial half-clips fixed to the rod, said clips having edges on their free end projecting outward, substantially radially, to form hooking lips on the outer surface of the second of the two elements,
- a central spacer with along the elongation axis between the two half-clips and fixed to the hollow body within which it is prevented from rotating and translating,
- the rod/half-clip set being axially mobile within the hollow body and along the spacer by rotating the nut on the threaded rod between a first position of rest, in which the hooking lips of both half-clips are radially close so as to be able to engage in the openings of the two elements, and an active second position, in which the two half-clips are retracted inside the hollow body and radially distanced along the spacer such that the hooking lips hang on the outer surface of the second element, on the edge of its opening, to keep the two elements against each other between said lips and the bearing surface on the first element.

Such tacks are described, for example, in patents FR 81 18309 and EP 0 336 808.

This invention also relates to the use of these tacks to temporarily fix a boring grid to the elements to be assembled.

Currently, the assembly of structurally complex elements, such as subassemblies of aircraft structures, requires very precise pre-boring in terms of the diameter and positioning of the boring axes relative to one another. A typical non-limiting example is comprised of assembling two half-wings on an airplane fuselage.

For this purpose, boring gauges are widely used and commonly called boring grids, comprising thick metals plates in which multiple guide slots are arranged, corresponding to the various borings to be made in the structural elements. These grids are now solidly fixed to the structure by means of calibrated bolts, tightened using nuts and washers, in the factory pre-bored reference holes in the elements to be assembled.

Because of the large dimensions of the structures to be assembled, it is impossible for one operator to have access to both sides of the assembly simultaneously. There must therefore be at least two operators, and often more, because of the significant weight of said boring grids, in order to put them into place and then to remove them after completing all of the borings. For the operators located on the inside, generally in a box with limited accessibility, the working conditions are often rather difficult. This technique involves substantial work time and labor costs to place and then remove all of the boring grids.

The eliminate having operators inside of the structure, or on the side opposite where the grids are placed, there must be an attachment system that is mountable and removable with access only on the outer side, an attachment system that makes it possible to work "blindly", without visually having access to the opposite side for its placement.

Riveting screw tacks of the type mentioned above can perform this function exactly. Moreover, because they can be removed without destruction, they are reusable. However, tacks currently available on the market are not accurate enough in their size and therefore cannot practically ensure the proper positioning of the boring grids.

Specifically, the half-clips, which are generally made by stamping using a round wire, have burrs on the tool joint plane. To eliminate these burrs, a cutting operating using shears is therefore necessary. This operation is particularly difficult to control, however, since the half-clips quite often are not symmetrical or matching.

Moreover, the spacer is usually obtained by cutting from a thin sheet or a strip, thus creating sharp edges.

In addition, the two half-clips are often assembled by crimping the end of the rod. This results in various defects in the shape, coaxiality, and symmetry in relation to the rod.

Finally, the spacer has a certain degree of lateral freedom with respect to the rod/half-clip axis and with respect to the hollow body axis, which creates risks of damaging the openings in the elements to be assembled or the half-clips.

All of these defects generate too much uncertainty in the positioning of the tacks and consequently of the boring grid.

The primary purpose of this invention is therefore to overcome these disadvantages by using a riveting screw tack of the type mentioned above, which is essentially characterized in that, at least in the tack's resting position, the assembly formed by the half-clip and the spacer, in the cross-section thereof, forms a near-perfect circle having a diameter identical to the to the inner diameter of the openings of the two elements to be assembled, with a minimum clearance to allow said assembly to slide lengthwise into said openings.

By a near-perfect circle, this means that there is continuity on the peripheral surface of each half-clip and the spacer, without any projections, or extremely low, within manufacturing tolerances. In other words, this continuity could be expressed by having cut a perfectly round cross-sectional cylinder in a in a central "slice", becoming the spacer, and two lateral slices, becoming the two half-clips. Combining these three parts would then form the described assembly.

In addition:
- the spacer is in the shape of a flat blade that has two parallel lengthwise sides and two convex lateral sides with an outer radius of curvature identical to the outer diameter of the half-clips;
- the spacer is provided, at a proximal end, with symmetric chamfers facilitating its engagement between the hooking lips and, at its other end, two symmetrical T-shaped shoulders to fix the spacer in an axial position rotating toward the inside of the hollow body; and,
- the half-clips are identical and symmetrical to the elongation axis.

The tack thus formed is particularly well suited to be used for positioning a boring grid comprising guide slots corresponding to various holes to be bored into the elements to be assembled.

For this purpose, the tack's hollow body comprises, on its external cylindrical surface, a nearly-spherical ring-shaped centering bearing whose outer diameter corresponds to the inner diameter of at least one of the guide slots on the grid.

In addition, the tack also has a cap mounted on the nut by means of a screw and whose outer diameter is greater than the inner diameter of said guide slot, the tightening of this screw attaching the grid to the elements to be assembled.

In one embodiment of the invention, the tack has a swivel for positioning the bearing surface of the hollow body.

In addition, the swivel has a ring-shaped centering bearing comprising a spherical convex external surface cooperating with a washer having a spherical concave internal surface complementary to the convex surface.

According to another embodiment of the invention, the bearing surface is comprised of a conical centering bearing having an apex of around 90° to 140°.

In yet another embodiment of the invention, the hollow body is surrounded by a hollow cylindrical sheath having an oblong cross-section comprised of two half-cylinders with a radius substantially equal to the outer radius of the hollow body, connected by two planes whose length is equal to the center distance between the two half-cylinders.

Advantageously, the hollow body is traversed by a circular opening that is coaxial to the spherical bearing and whose diameter is identical to the diameter of the assembly formed by the half-clips and the spacer.

The assembly formed by the half-clips has a space, measured at their free ends, that gradually decreases in the direction of the lips at an angle less than 45°, preferably around 20°, so that the movement of the half-clips from the rest position to the active position happens very quickly, with little axial movement by the spacer of around 15 mm, and low rotation of the nut on the threaded rod.

Both half-clips are centered exactly on the opening of one of the elements, which allows for greater centering accuracy, particularly if the openings on the elements to be assembled have slightly different diameters and/or are not perfectly coaxial.

The invention also relates to a method using this tack to attach, at least temporarily, two elements with coaxial openings to accept a part of said tack.

Finally, the invention also related to the use of this tack to accurately position a boring grid on two elements to be assembled having coaxial openings to accept a part of said tack.

This invention will now be described in more detail, with reference to the particular embodiments given by way of illustration only and represented in the appended figures, in which:

FIG. 1 is a top view of a boring grid to be used as a template for boring the structural elements to assemble;

FIG. 2 is a cross-sectional view of the grid from FIG. 1, positioned on said structural elements;

FIG. 3 shows the boring grid fixed to the elements to assemble, according to the prior art technique;

FIG. 7 is a cross-sectional view of a tack according to this invention;

FIG. 8 is an exploded view of the tack from FIG. 7;

FIGS. 9 and 10 are cross-sectional views representing two stages of placing a tack according to this invention;

FIG. 11 is a cross-sectional view of half-clips provided with the tack;

FIG. 12 is a cross-sectional view of a spacer provided with the tack;

FIG. 13 is a cross-sectional view of the spacer and half-clips;

FIG. 17 is another embodiment of a tack according to this invention;

FIG. 18 is a cross-sectional view of yet another embodiment of a tack according to this invention; and FIG. 19 is a cross-sectional view along the XIX-XIX line in FIG. 18.

Figure 4:
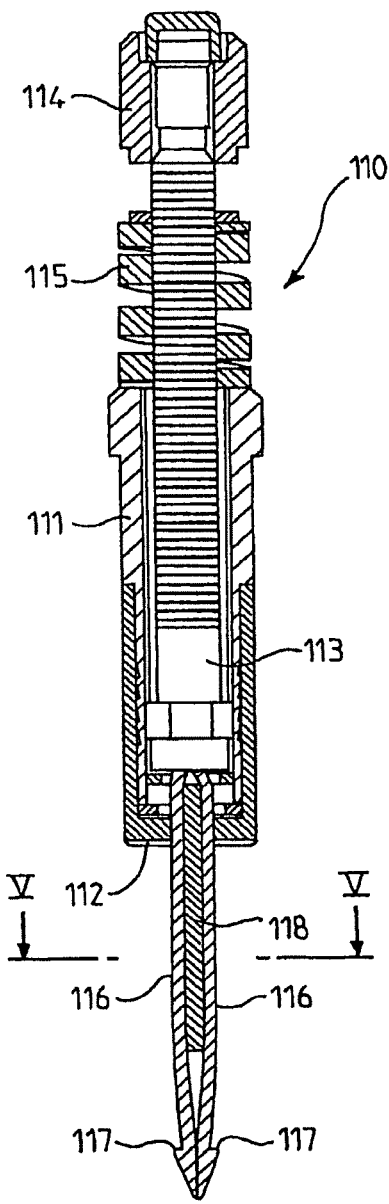
FIG. 4 is a cross-sectional view of a tack from the prior art, as described for example in patent FR 81 18309.

FIG. 1 shows a boring grid 10 to be fixed to an aircraft structure shown in FIG. 2. This structure is comprised here of two elements to be assembled 20 and 20'.

As can be seen, the boring grid 10 forms a template that must be positioned with extreme precision. This grid 10 includes a series of penetrating guide slots 12 distributed over its entire surface and corresponding to the various holes to bore into the structure by means of boring units positioned in said guide slots.

Some of these guide slots 12 are designed to accept riveting screw tacks, which are the subject of this invention and will be described in more detail later. To this end, said guide slots are coaxial with reference openings 22, 22', arranged through elements 20, 20', as illustrated in FIG. 2, and which are pre-bored in a factory.

In a certain type of prior art, illustrated by FIG. 3, it was common to use tightening systems 100 comprising a bolt 101 combined with a nut 102 on the elements 10 and 20 to be assembled. However, such an arrangement is possible only when the operator can access both external surfaces.

Thus, when one of the external surfaces is not accessible, it is necessary to use a "blind" means of tightening, one that can be tightening and loosened by handling on one side. This is the particular function that the riveting screw tacks 110 can perform, such as that in the prior art illustrated by FIGS. 4 to 6.

Typically, a screw tack 100 from the prior art comprises:
- a hollow cylindrical body 111 extending along an elongation axis and having a bearing surface 112 intended to come into contact with the outer surface of one of the elements,
- a central rod 113 locally passing through the hollow body and having a portion located inside said hollow body provided with an external threading,
- a nut 114 mounted on the threaded rod,
- a compression spring 115 located opposite the bearing surface 112,
- two axial half-clips 116 fixed to the central rod 113, said clips having edges on their free end projecting outward, substantially radially, to form hooking lips 117, and
- a central spacer 118 with between the two half-clips 116 and fixed to the hollow body 111 within which it is prevented from rotating and translating.

The rod 113/half-clip 116 assembly is designed to be able to axially move inside the hollow body 111 and along the spacer 118 by rotating the nut 114 on the threaded rod between a first position of rest, in which the hooking lips 117 of both half-clips are radially close so as to be able to engage in the openings 22, 22' of the elements 20, 20' to be assembled, and an active second position, in which the two half-clips 116 are retracted inside the hollow body 111 and radially distanced along the spacer 118 such that the hooking lips 117 hang on the outer surface of the second element 20', on the edge of its opening 22'.

Figure 5:
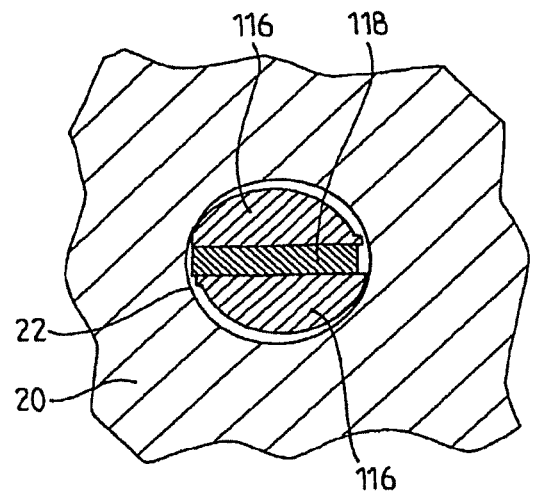
FIGS. 5 and 6 are cross-sectional views along the V-V axis in FIG. 4, illustrating the tack from the prior art inserted into an opening in an element to be assembled.
Figure 6:
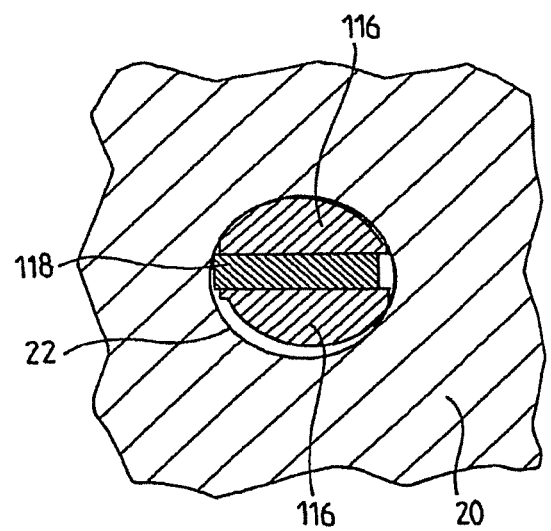

As can be seen in FIGS. 5 and 6, due to the design of the spacer 117 and the half-clips 116, there is a large clearance between them and the internal surface of the opening 22. Moreover, the edges of the spacer 118, whose cross-section is rectangular, can greatly damage the internal surface of the openings 22, 22'.

Accordingly, not only do the tacks from the prior art not allow a correct positioning of the grid 10 on the structure 20, 20', mainly because of the shape of the half-clips and the space and the radial clearance J, but there is also a significant risk of damaging the openings 22, 22' of the structure.

FIG. 7 illustrates a first embodiment of a riveting screw tack 50 according to this invention and designed to be fixed to the half elements 20, 20' in FIG. 2 to be assembled by at least temporarily tightening the boring grid 10.

This tack 50 is thus comprised of:
- a hollow cylindrical body 51 extending along an elongation axis XX' and comprising a bearing surface 52 designed to come into contact with the external surface 21 of the element 20 (see FIG. 7), said bearing surface being traversed by a circular opening 52a,
- a central rod 53 locally passing through the hollow body 51 and having a portion located inside said hollow body provided with an external threading 53a,
- a nut 54 mounted on the threaded end 53a of the central rod 53 and supported on the end surface 51a of the hollow body,
- two axial half-clips 56 fixed to the central rod 53, said clips having edges 57 on their free end 56a projecting outward, substantially radially, to form hooking lips,
- a central spacer 58 with along the elongation axis XX' between the two half-clips 56 and fixed to the hollow body 51 within which it is prevented from rotating and translating.

The central rod 53/half-clip 56 assembly is adapted to be able to axially move inside the hollow body 51 and along the spacer 58 by rotating the nut 54 on the threaded rod 53a between a first position of rest, in which the hooking lips 57 are radially close so as to be able to engage in the openings 22, 22' of the elements to be assembled 20, 20' (FIG. 9), and an active second position, in which the two half-clips 56 are retracted inside the hollow body 51 along the arrow F (FIG. 10) and radially distanced along the spacer 58 such that the hooking lips 57 hang on the outer surface 23 of the element 20', on the edge of its opening 22'.

The two half-clips 56 are identical and symmetrical to the longitudinal axis XX' of the hollow body 51.

The spacer 58 is provided, at a proximal end 58a, with symmetric chamfers 59 facilitating its engagement between the hooking lips 57 and, at its other end 58b, two symmetrical T-shaped shoulders 60 to fix the spacer in an axial position rotating toward the inside of the hollow body 51.

Advantageously, as seen in FIGS. 11 to 13, the assembly formed by the half-clips 56 and the spacer 58 is, in the cross-section thereof, in the form of a near-perfect circle having a diameter D identical to the inner diameter of the openings 22 and the circular opening 52a, with a strictly minimal clearance to allow said assembly to slide lengthwise into said openings 22.

By a near-perfect circle (i.e. within manufacturing tolerances), this means that the peripheral surfaces of each half-clip and the spacer are substantially continuous and form a perfect circle, without radial projections, or a circle with an extremely small diameter at the spacer.

More specifically, the circle formed by the two half-clips 56 in the rest position, before insertion into an opening 22, has a diameter that is substantially equal to the diameter of said opening 22.

Similarly, as seen in FIG. 12, the spacer 58, in cross-section thereof, has the general shape of a rectangular flat blade having two parallel lengthwise surfaces 58c and two convex lateral sides 58d with a radius of curvature substantially equal to half of the inner diameter of the opening 22.

Thus, once the spacer 58 is mounted between the half-clips 56, as illustrated in FIG. 13, the assembly forms, in cross-section, a near-perfect circle having a minimum clearance with both the internal diameter of the opening 52a and the inner diameter of the opening 22, to allow the insertion and axial sliding of the tack 50 into the Opening.

Figure 14:
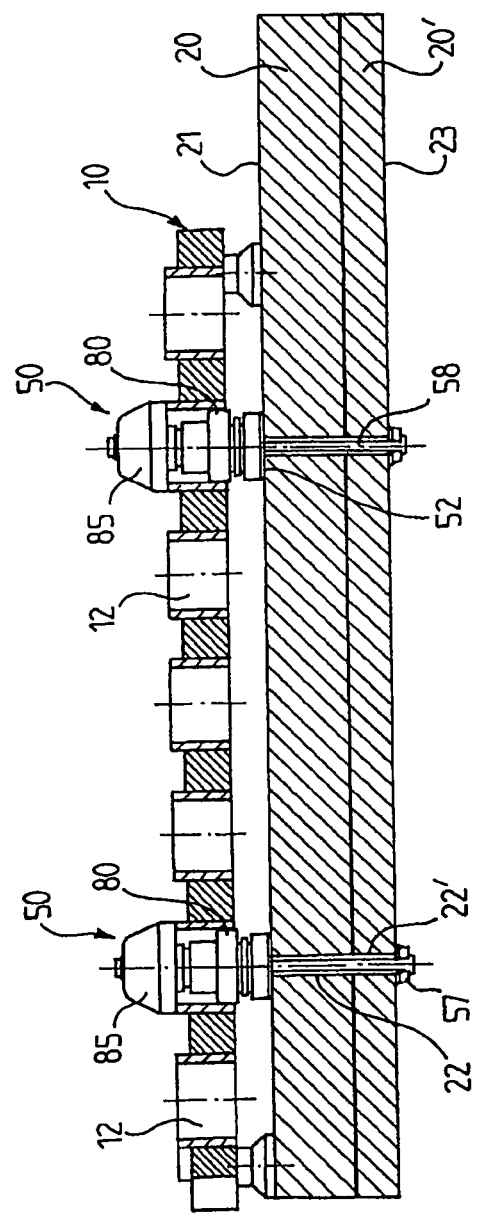
FIG. 14 is a cross-sectional view illustrating the positioning of a boring grid on the elements to be assembled by means of tacks according to the invention.

The tack 50 according to the invention, as illustrated in FIG. 14, therefore allows the boring grid 10 to be accurately positioned on the two elements to be assembled 20, 20' using additional means that will be described later in more detail.

Figure 15:
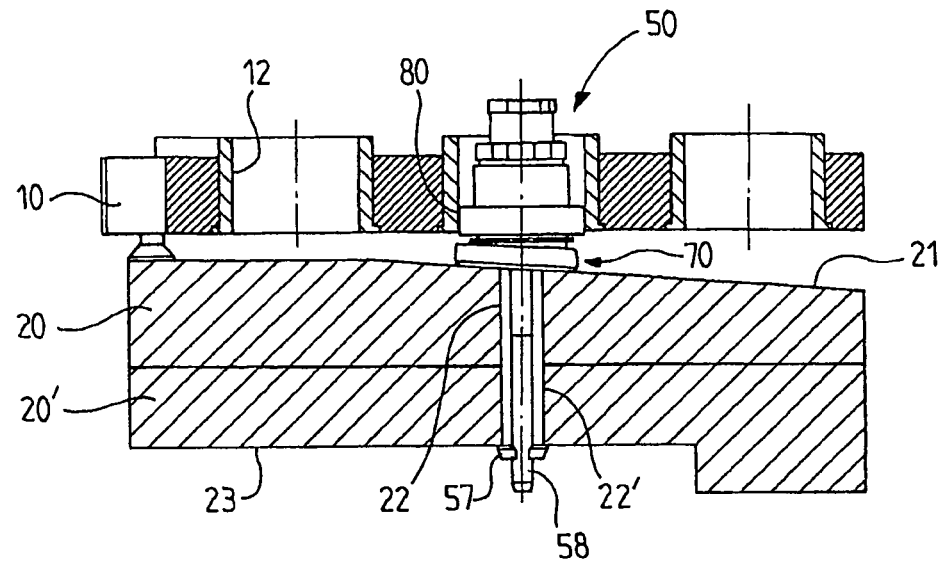
FIG. 15 is a cross-sectional view of a boring grid mounted on the elements to be assembled using an embodiment of the tack according to this invention.
Figure 16:
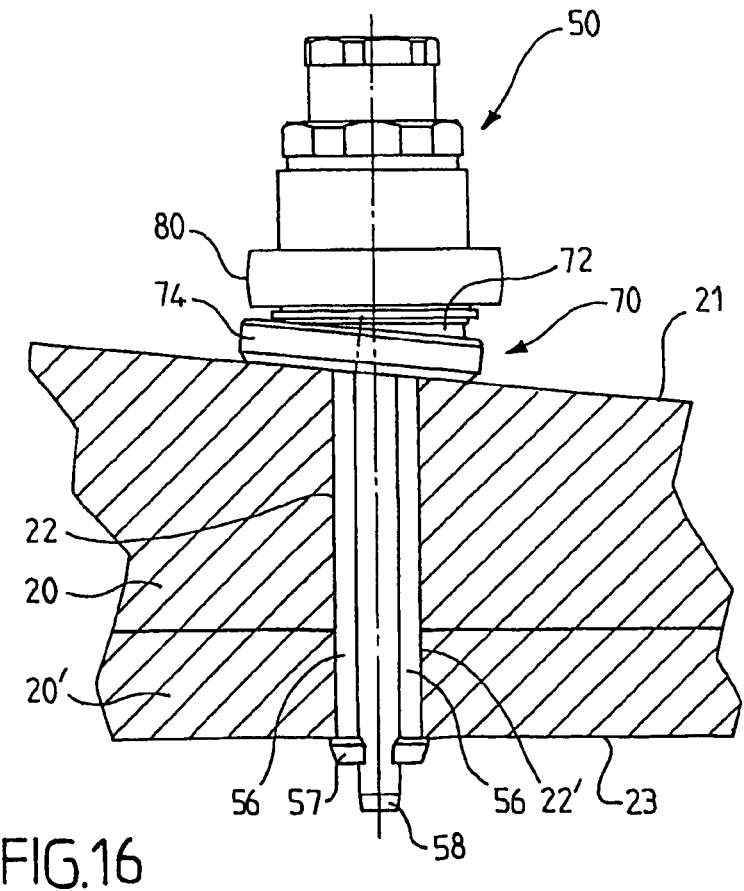
FIG. 16 is a detailed view of FIG. 15.

FIGS. 15 and 16 illustrate an embodiment in which the surface 21 of the element 20 on which the bearing surface 52 of the tack 50 rests is inclined with respect to the main axis XX' of the hollow body 51.

To allow for an optimal positioning of the tack 50 with respect to the respective openings on the boring grid 10 and the structure 20, 20', the tack can be equipped with a positioning swivel 70 to compensate for the difference in parallelism between the bearing surface 52 and the rest surface 21.

The swivel 70 has, as shown in FIG. 8, a ring-shaped centering bearing 72 comprising a spherical convex external surface 73 cooperating with a bearing washer 74 having a spherical concave internal surface 75 complementary to the convex surface 73.

Thus, when the bearing surface 52 of the bearing washer 74 rests on the external surface 21 of the element 20, the spherical concave surface 75 of the bearing washer 74 can pivot against the spherical convex surface 73 of the bearing 72 to hold the tack 50 in the axis of the coaxial openings 12 22 and 22'. This swivel system allows the tack to self-adjust on the external surface 21 of the element 20. In aerospace, it is rather common for such parts to have decreasing thicknesses, resulting in a slope on at least one of their outer surfaces, as in this case. The angle of rotation for this swivel 70 is ±10°.

According to an embodiment illustrated in FIG. 17, the bearing surface is comprised of a conical centering bearing 78 having an apex of around 90° to 140°. This conical countersink, for example, allows the tack 50 to be positioned in a pre-bored guide opening in the upper element 20 with a countersunk hold also having an apex of around 90° to 140°, adjusted for example to ultimately accept a standard countersunk screw head.

In these various embodiments, the hollow body 51 is surrounded by a pseudo-spherical bearing 80 shown in FIGS. 7, 8, 14, and 15. This bearing has a maximum outer diameter substantially equal to the sliding assembly, close to the inner diameter of the guide slot 12 on the boring grid 10, as illustrated in FIG. 15. The pseudo-spherical bearing 80 allows the guide slot 12 on the boring grid 10 to engage, without jamming, with the tack 50, forming a baseline surface for positioning the boring grid 10.

Advantageously, the circular opening 52a traversing the hollow body 51 is perfectly coaxial with the centering bearing 80, the diameter of said opening being equal to the half-clip/spacer diameter, with the strictly minimal mechanical clearance needed for the half-clips to slide. Thus, when the tack is inserted into the reference holes 22 and 22' bored into the elements to be assembled, the axis of the centering portion 80 is perfectly aligned with the axis of said hole by means of the rod/clip assembly being perfectly centered in the hole. This advantageous arrangement makes it possible to then position and center, as accurately as desired, the guide slot 12 on the boring grid 10 on the centering portion 80 of the tack, hence the name of the center positioning device assigned to this type of tack.

As shown in FIGS. 7, 8, 14, 17, and 18, the tack 50 also has a cap 85 mounted on the nut 54 by means of a screw 88 engaging in a back threading 55 of the screw. This cap has a diameter greater than the inner diameter of the guide slots 12 on the boring grid 10 and thus allows, by tightening the screw 88, the grid 10 to be solidly fixed to the two elements to be assembled 20 and 20', as illustrated in FIG. 14.

According to a "self-adjusting" embodiment, such as illustrated in FIGS. 18 and 19, the hollow body 51 has an outer diameter that is smaller than in previous embodiments so as to be able to be surrounded by a hollow cylindrical sheath 90 forming a single piece with the cap 85. This sheath 90, on its edge, is equipped with a pseudo-spherical bearing 80 intended to meet with the inside of the guide slot 12 on the boring grid 10.

The sheath 90 also has an oblong cross-section comprised of two half-cylinders 92 with a radius substantially equal to the outer radius of the hollow body 51, connected by two planes 94 whose length is equal to the center distance between the two half-cylinders. This particular shape, illustrated in more detail in FIG. 19, allows for a radial rotation along a single axis between the hollow body 51 and the additional sheath 90. This embodiment is called "locating", according to the standard mechanical terminology, describing a device capable of a certain degree of self-alignment, whose maximum rotation is equal to the center distance between the two cylinders forming the oblong shape of the inner wall of the additional sheath 90.

Using this type of riveting screw tack to fix a grid 10 forming a boring template to the structure of an aircraft comprising elements 20 and 20' is done as follows.

The structural elements to be assembled 20 and 20' are respectively factory pre-bored as openings 22 and 22'. The operator selects the tack 50 with a half-clip diameter that is best adapted to the openings 22 and 22' at rest, and the central rod 53/half-clip 56/spacer 58 assembly can be effortlessly engaged into the openings. Advantageously, the two half-clips 56 are centered exactly on the opening 22 of the first element 20.

The rotation of the nut 54 in the direction to tighten using a screwdriver or an appropriate wrench causes the central rod 53/half-clip 56 assembly to retract to the inside of the hollow body 51. The two half-clips 56 are thus driven by sliding along the arrow F in FIG. 10 both inside the openings 22, 22' and the opening 51a, and along the longitudinal surfaces 58c of the spacer 58, the spacer being prevented from rotating and translating with respect to the hollow body 51 due to the T-shaped shoulder 50. The chamfered ends of the spacer are then engaged in the gap between the two hooking lips 57 and cause their radial separation. The anterior surfaces of the bearing 57a of the two lips 57 are then supported on the posterior external face 23 of the element 20' until said lips fully hang over by being compressed between the support bearing 52 of the hollow body 50 and said anterior surfaces 57a (see FIG. 10).

Because the rigorously parallel flat surfaces 58c on the spacer 58 and in the groove created between the two half-clips 56, the circular shape of the half-clips and the space are perfectly maintained during the axial retraction of the half-clips. Thus, perfect contact is constantly maintained between the inner wall of the openings 22, 22' and the cylindrical peripheral surfaces of the half-clips 56 and the spacer 58, from the start of the retraction to the final pressing of the lips 57.

The assembly formed by the half-clips 56 has an internal space, measured at the level of their free ends 56a, that gradually decreases in the direction of the lips 57 at an angle less than 45°, preferably close to 20°. Thus, the movement of the half-clips from the rest position to the active position by sliding along the spacer 58 happens much more quickly than in tacks from the prior art, with little rotation of the nut 54 on the threaded rod 53 and a maximum lengthwise movement of the spacer 58 of around 15 mm for the application of the preload.

The guide slots 12 on the boring grid 10 then need to be positioned on the tack 50, and then the cap 85 is placed in order to solidly fix the boring grid 10 to the elements to be assembled, as illustrated in FIG. 13, to then be able to support the efforts of boring units.

It goes without saying that the detailed description of the subject of the invention, given only as an example, does not in any way create a limitation, the equivalent techniques being also included in the scope of this invention.

Therefore, the cap 85 can be fixed to the nut 54 in a way other than using the screw 88. Thus, the screw 88 can be directly integrated into said cap and be screwed into a bore in the nut, or inversely, or other methods of fixation that may be conceivable within the scope of the invention.

The invention claimed is:

1. A riveting screw tack (50) to be introduced into the respective coaxial openings (22, 22') of at least two elements (20, 20') to be assembled and in the guide slots (12) of a template-forming boring grid (10), coaxial with the openings (22, 22') of the two elements (20, 20'), the tack comprising:
   a hollow cylindrical body (51) extending along an elongation axis (XX') and having a bearing surface (52) intended to come into contact with an outer surface (21) of the first (20) of the two elements,
   a central rod (53) locally passing through the hollow body (51) and having a portion located inside said hollow body provided with an external threading (53a),
   a nut (54) mounted on the threaded end (53a) of the rod (53) and supported on an end surface (51a) of the hollow body (51),
   two axial half-clips (56) fixed to the rod (53), said clips having edges (57) on their free end (56a) projecting outward, substantially radially, to form hooking lips on the outer surface of the second of the two elements (20'),
   a central spacer (58) with along the elongation axis (XX') between the two half-clips (56) and fixed to the hollow body (51) within which it is prevented from rotating and translating,
   the rod/half-clip set being axially mobile within the hollow body (51) and along the spacer (58) by rotating the nut (54) on the threaded rod (53a) between a first position of rest, in which the hooking lips (57) of both of the half-clips (56) are radially close so as to be able to engage in the openings (22, 22') of the two elements (20, 20'), and an active second position, in which the two half-clips (56) are retracted inside the hollow body (51) and radially distanced along the spacer (58) such that the hooking lips (57) hang on the outer surface (23) of the second element (20'), on the edge of its opening (22'), to keep the two elements against each other between said lips (57) and the bearing surface (52) on the first element (20), at least in the rest position of the tack (50), the assembly formed by the half-clips (56) and the spacer (58) being, in the cross-section thereof, in the form of a near-perfect circle whose diameter (D) is identical to the inner diameter of the openings (22, 22') of the two elements (20, 20') to be assembled, with a minimal clearance to allow said assembly to slide lengthwise into said opening, the hollow body comprising a nearly-spherical ring-shaped centering bearing (80) whose outer diameter corresponds to the inner diameter of at least one of the guide slots on the grid, said centering bearing being held by an external cylindrical surface (51) of the hollow body, or by a hollow cylindrical sheath (90) having an oblong cross-section comprised of two half-cylinders (92) with a radius substantially equal to the outer radius of the hollow body, connected by two planes (94) whose length is equal to the center distance between the two half-cylinders, wherein the tack also has a cap (85) mounted on the nut (54), the outer diameter of said cap being greater than the inner diameter of said guide slot (12).

2. The tack according to claim 1, wherein the cap (85) is mounted on the nut (54) by means of a screw (88), the tightening of this screw (88) attaching the grid (10) to the elements to be assembled (20, 20').

3. The tack according to claim 1 or claim 1, wherein the spacer (58) is in the shape of a flat blade that has two parallel lengthwise sides (58*c*) and two convex lateral sides (58*d*) with an outer radius of curvature identical to the outer diameter of the half-clips (56).

4. The tack according to claim 3, wherein the spacer (58) is provided, at a proximal end (58*a*), with symmetric chamfers (59) facilitating its engagement between the hooking lips (57) and, at its other end (58*b*), two symmetrical T-shaped shoulders (60) to fix the spacer (58) in an axial position rotating toward the inside of the hollow body (51).

5. The tack according to claim 1 or claim 2, wherein the half-clips (56) are identical and symmetrical to the elongation axis (XX').

6. The tack according to claim 1 or claim 2 having a positioning swivel (70) on the bearing surface (52) of the hollow body (51).

7. The tack according to claim 6, wherein the swivel (70) has a ring-shaped centering bearing (72) comprising a spherical convex external surface (73) cooperating with a bearing washer (74) having a spherical concave internal surface (75) complementary to the convex surface (73).

8. The tack according to claim 1 or claim 2, wherein the bearing surface is comprised of a conical centering bearing (78) having an apex of around 90° to 140°.

9. The tack according to claim 1, wherein the hollow body (51) is traversed by a circular opening (52*a*) that is coaxial to the spherical bearing (80) and whose diameter is identical to the diameter (D) of the assembly formed by the half-clips (56) and the spacer (58).

10. The tack according to claim 1 or claim 2, wherein the assembly formed by the half-clips (56) has an internal space, measured at the level of their free ends (56*a*), that gradually decreases in the direction of the lips (57) at an angle less than 45°.

11. The tack according to claim 1 or claim 2, wherein the hollow cylindrical body (51) is centered precisely on the opening (22) of one of the elements (20).

12. A method using the tack according to claim 1 or claim 2, at least temporarily, the two elements with coaxial openings to accept a part of said tack.

13. A use of the tack according to claim 1 or claim 2 to accurately position a boring grid on the two elements to be assembled having coaxial openings to accept a part of said tack.

14. The tack according to claim 1 or claim 2, wherein the centering bearing is held by the hollow cylindrical sheath (90) forming a single piece with the cap (85).

\* \* \* \* \*